Jan. 27, 1925.  1,524,596
T. L. TALIAFERRO
METHOD OF FORMING AND APPLYING SEALING RINGS TO JAR COVERS
Filed Sept. 13, 1922    2 Sheets-Sheet 1
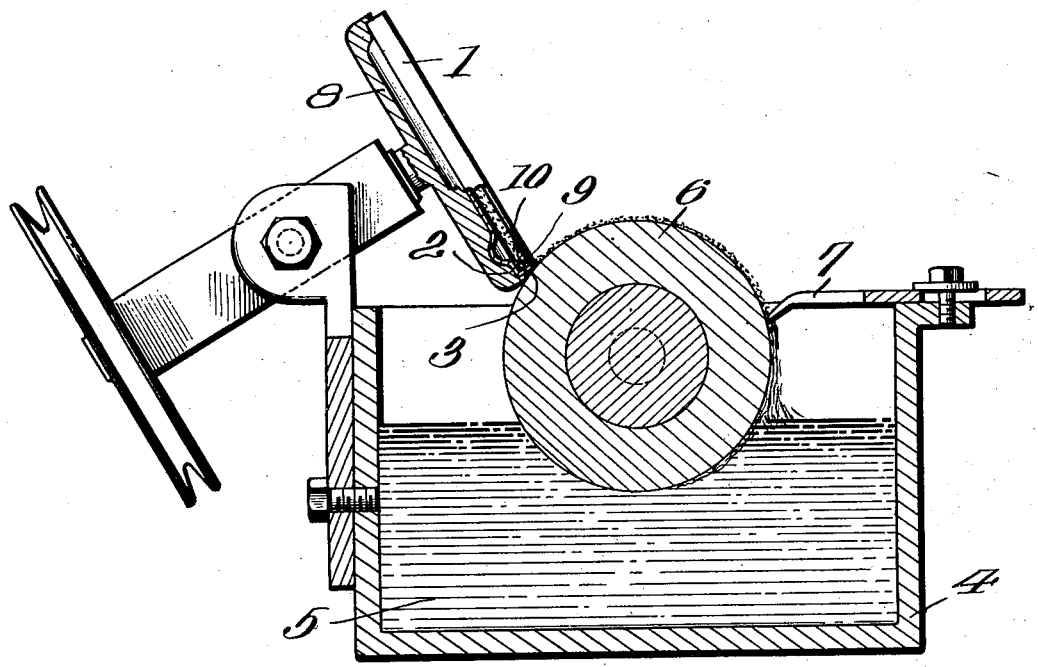
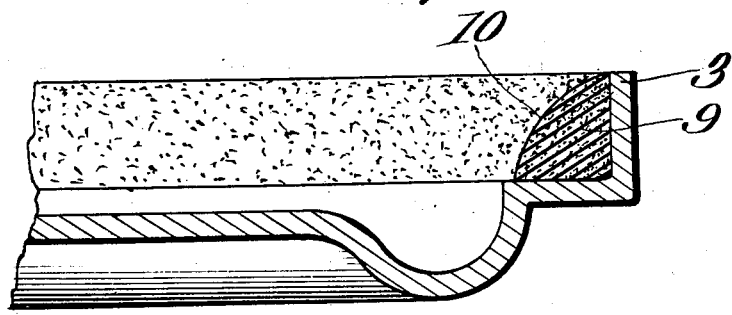

Jan. 27, 1925.
T. L. TALIAFERRO
1,524,596
METHOD OF FORMING AND APPLYING SEALING RINGS TO JAR COVERS
Filed Sept. 13, 1922    2 Sheets-Sheet 2
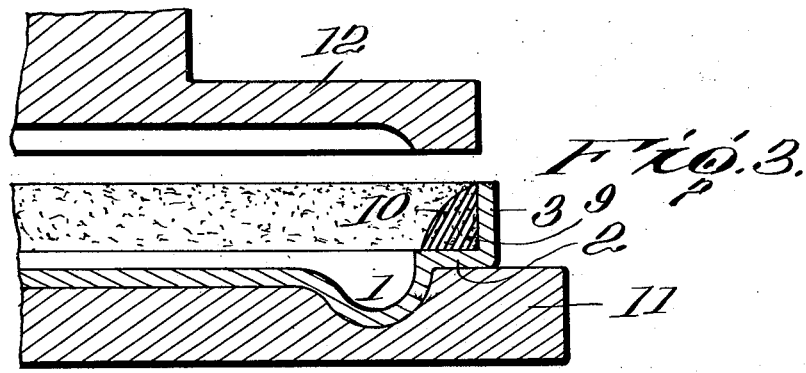
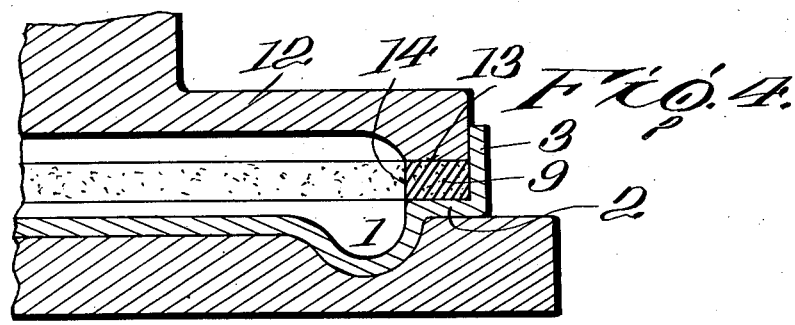
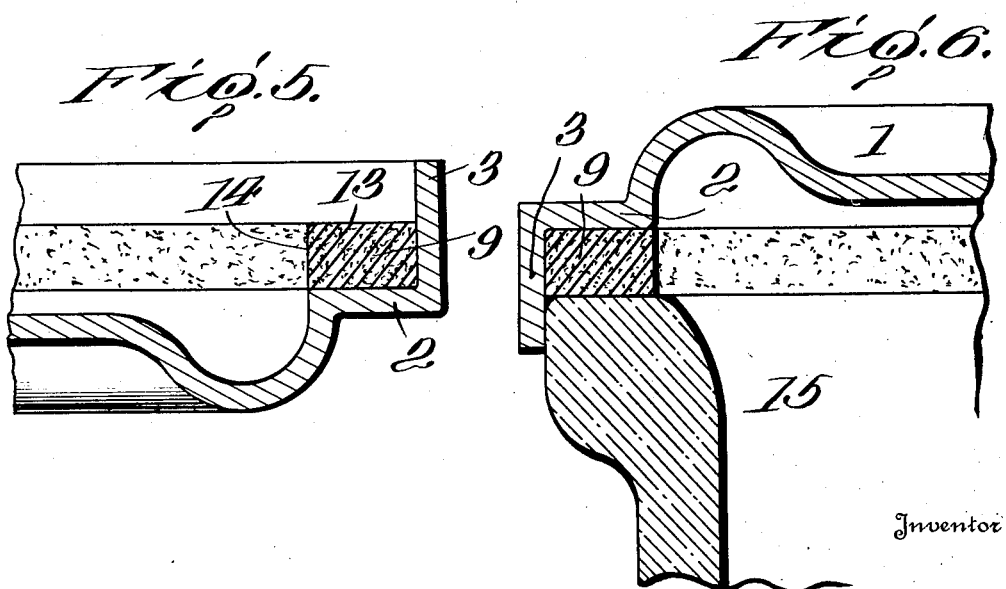
Inventor
Thomas L. Taliaferro
By Sturtevant & Mason
Attorneys Patented Jan. 27, 1925.

1,524,596

UNITED STATES PATENT OFFICE.

THOMAS L. TALIAFERRO, OF CHICAGO, ILLINOIS, ASSIGNOR TO PHOENIX HERMETIC COMPANY, OF CHICAGO, ILLINOIS, A CORPORATION OF NEW YORK.

METHOD OF FORMING AND APPLYING SEALING RINGS TO JAR COVERS.

Application filed September 13, 1922. Serial No. 588,003.

*To all whom it may concern:*

Be it known that I, THOMAS L. TALIAFERRO, a citizen of the United States, residing at Chicago, in the county of Cook, State of Illinois, have invented certain new and useful Improvements in Methods of Forming and Applying Sealing Rings to Jar Covers, of which the following is a description, reference being had to the accompanying drawing and to the figures of reference marked thereon.

The invention relates to new and useful improvements in the method of forming and applying sealing rings to jar covers.

An object of the invention is to provide a method of forming and applying a sealing ring to a jar cover wherein said sealing ring is shaped from a mass of plastic sealing material applied to the ring seat on the jar cover.

A further object of the invention is to provide a method of forming and applying sealing rings to jar covers wherein the mass of plastic material from which the sealing ring is to be formed is scraped on to the jar cover and is shaped and firmly secured to the jar cover by a forming die.

A still further object of the invention is to provide a method of the above character wherein the forming die operates to strip the mass of sealing material from the inside of the flange of the jar cover and to form from said mass a sealing ring having its lower sealing face parallel with the plane of the ring seat on the jar.

These and other objects will in part be obvious and will in part be hereinafter more fully described.

In order to better understand the method, I have illustrated more or less diagrammatically, certain devices which may be utilized in carrying out the invention and the jar cover in the various stages through which it passes during the forming of the sealing ring.

In the drawings:—

Figure 1 shows an apparatus for scraping the sealing material on to a jar cover;

Fig. 2 shows an enlarged section of the jar cover after the sealing material has been scraped on to the same;

Fig. 3 shows an apparatus including a forming die for engaging the mass of material on the jar cover for shaping the same into a sealing ring, said die being out of contact with the mass of material;

Fig. 4 is a similar view but showing the die moved down so as to shape the material and scrape the mass from the inner side edge of the flange of the jar cover;

Fig. 5 is an enlarged view showing a portion of the jar cover with the sealing ring shaped and applied to the cover, and Fig. 6 is a view showing a portion of a jar with a jar cover applied thereto having my improved form of sealing ring.

The invention is particularly adapted for forming and applying a sealing ring to a jar cover 1, which jar cover has a horizontal ring seating section 2 and a depending flange 3. The cover is first presented to an apparatus for scraping a plastic sealing material on to the ring seat 2. Said apparatus consists of a tank 4 containing a plastic sealing material 5 in which is mounted a coating roller 6 of some considerable length. This coating roller 6 rotates in a counterclockwise direction as viewed in Fig. 1. A doctor or scraper 7 scrapes off the surplus material taken up by the rotating roll, leaving a thin layer of plastic sealing material on the roller. The jar cover 1 is rolled along a suitable support 8 with its lower edge in contact with the roll 6, and as it rolls along said edge, the plastic sealing material will be scraped from the roll on to the jar cover. A suitable form of apparatus for scraping the sealing material on to the jar cover is shown and described in my prior Patent No. 1,089,350, granted March 3, 1914.

In Fig. 2 of the drawing, I have shown on an enlarged scale, the cover after it comes from the scraping device and the sealing material is indicated in said figure at 9. Said sealing material extends across the seat 2 and up the entire flange 3, and also diagonally across from the top of the flange to the inner edge of the ring seat as indicated at 10. This sealing material as it is scraped on to the jar cover is in a plastic condition and is formed of suitable material so that it readily sets or dries sufficiently so that the cover may be handled while in a horizontal position. The cover is next applied to a chuck 11 with its coated face upward, and is then presented to a forming die 12. In Fig. 3, the forming die is shown directly above the cover ready to descend on to the plastic sealing material. In Fig. 4, the die is shown as coming down on to the plastic sealing material 9, and scraping the sealing material off from the inside edge of the flange 3 of the jar cover. Said die will force a portion of the plastic sealing material adjacent the flange 3 downward, and this will force some of the plastic sealing material inward toward the center of the jar cover and will result in forming a sealing ring having a substantially horizontal sealing surface 13, and with a substantially inner vertical edge 14. The chuck 11 and die 12 may be slightly heated during this re-forming and shaping of the plastic sealing ring if found necessary. I prefer to use a plastic sealing substance which softens with heat so that it may be readily re-shaped and thus formed into a sealing ring. Such a substance when applied to the jar, will also respond to the heat of the contents of the jar and becomes softened so as to fill all the little crevices or irregularities in the shaping of the glass, thus forming a very tight seal. In Fig. 6, I have shown a jar 15 which is of the usual construction with my cover having the improved sealing ring applied thereto.

By scraping the sealing material from the inside of the depending flange, I provide a jar cover wherein the sealing material does not in any way interfere with the applying of the jar cover to the standard size jar.

It is obvious of course, that other ways of scraping the sealing material on to the jar cover may be provided and that other ways of shaping the mass to form a sealing ring, without departing from the spirit of the invention as set forth in the appended claims.

Having thus described the invention, what I claim as new and desire to secure by Letters-Patents, is—

1. The method of forming and applying sealing rings to jar covers having a ring seat, consisting in scraping a mass of plastic sealing material on the ring seat by presenting the edge of the jar cover to a coating member and subsequently applying die pressure to the mass thus deposited on the ring seat for shaping the same into a sealing ring.

2. The method of forming and applying sealing rings to jar covers having a ring seat and a depending flange adjacent the outer edge of said ring seat, which consists in scraping a mass of plastic sealing material on to the ring seat by presenting the edge of the flange to a coating member and subsequently applying die pressure to the mass on the ring seat for shaping the same into a sealing ring.

3. The method of forming and applying sealing rings to jar covers having a ring seat and a depending flange adjacent the outer edge of said ring seat, which consists in scraping a mass of plastic sealing material on to the ring seat by presenting the edge of the flange to a coating member and subsequently applying die pressure to the mass on the ring seat for shaping the same into a sealing ring, said die pressure being secured by a reciprocating die which is shaped so as to scrape all of the plastic material off from the extreme lower edge portion of the depending flange at the inside thereof so as to leave said flange free at the entrance end to receive the jar.

4. The method of forming and applying sealing rings to jar covers having a ring seat and a depending flange adjacent the outer edge of said ring seat, which consists in scraping a mass of plastic sealing material on to the ring seat by presenting the edge of the flange to a coating member, and subsequently subjecting the plastic sealing material on the ring seat to a die plate shaped so as to pass inside of the flange and scrape the sealing material therefrom, and force said sealing material against the ring seat forming thereon a sealing ring which is substantially rectangular in cross section.

In testimony whereof, I affix my signature.

THOMAS L. TALIAFERRO.